(12) United States Patent
Mendonsa et al.

(10) Patent No.: US 9,390,738 B1
(45) Date of Patent: Jul. 12, 2016

(54) READING AND WRITING TO A HAMR RECORDING MEDIUM AT DIFFERENT SKEW ANGLES

(71) Applicant: Seagate Technology LLC, Cupertino, CA (US)

(72) Inventors: Riyan Mendonsa, Minneapolis, MN (US); Douglas A. Saunders, Lakeville, MN (US); Pu-Ling Lu, Rosemount, MN (US); James H. McGlennen, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/723,802

(22) Filed: May 28, 2015

(51) Int. Cl.
| | | |
|---|---|---|
| G11B 5/48 | (2006.01) | |
| G11B 5/00 | (2006.01) | |
| G11B 5/31 | (2006.01) | |
| G11B 5/187 | (2006.01) | |
| G11B 5/60 | (2006.01) | |
| G11B 13/08 | (2006.01) | |
| G11B 7/1387 | (2012.01) | |
| G11B 5/02 | (2006.01) | |

(52) U.S. Cl.
CPC ............ *G11B 5/4866* (2013.01); *G11B 5/1871* (2013.01); *G11B 5/314* (2013.01); *G11B 5/4886* (2013.01); *G11B 5/6088* (2013.01); *G11B 7/1387* (2013.01); *G11B 13/08* (2013.01); *G11B 5/02* (2013.01); *G11B 5/3116* (2013.01); *G11B 2005/0021* (2013.01)

(58) Field of Classification Search
CPC .................... G11B 5/4866; G11B 2005/0021; G11B 5/314; G11B 5/6088; G11B 2005/001; G11B 7/1387; G11B 5/3116; G11B 11/10554; G11B 11/1058; G11B 5/3133; G11B 5/3163; G11B 13/08; G11B 5/1871
USPC .............. 369/13.33, 13.13, 13.11; 360/78.14, 360/78.05, 78.03, 59
See application file for complete search history.

(56) References Cited

U.S. PATENT DOCUMENTS

| | | | |
|---|---|---|---|
| 5,920,441 A * | 7/1999 | Cunningham | G11B 5/5552 360/78.03 |
| 8,094,523 B2 | 1/2012 | Kamijima et al. | |
| 8,351,305 B2 | 1/2013 | Zhou et al. | |
| 8,811,127 B1 * | 8/2014 | Hirata | G11B 5/3133 369/13.13 |
| 9,064,528 B1 * | 6/2015 | Krichevsky | G11B 11/10536 |
| 9,087,541 B1 * | 7/2015 | Pokharel | G11B 5/6005 |

* cited by examiner

*Primary Examiner* — Ali Neyzari
(74) *Attorney, Agent, or Firm* — Hollingsworth Davis, LLC

(57) ABSTRACT

Bits are written to a track of a heat-assisted magnetic recording medium via a write transducer at a first skew angle. The track is read via a read transducer oriented at a second skew angle different from the first skew angle. The second skew angle causes the read transducer be more closely aligned with boundaries of the bits than if oriented at the first skew angle.

20 Claims, 8 Drawing Sheets

READING AND WRITING TO A HAMR RECORDING MEDIUM AT DIFFERENT SKEW ANGLES

SUMMARY

The present disclosure is directed to reading and writing to a heat-assisted magnetic recording medium at different skew angles. In one embodiment, a method and apparatus facilitates writing bits to a track of a heat-assisted magnetic recording medium via a write transducer at a first skew angle. The track is read via a read transducer oriented at a second skew angle different from the first skew angle. The second skew angle causes the read transducer be more closely aligned with boundaries of the bits than if oriented at the first skew angle.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to reading and writing of data with a heat assisted magnetic recording device (HAMR). This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

In the embodiments described below, the hotspot may primarily define the size and shape of bits as they are written to the recording medium. This is because the hotspot may be significantly smaller than an area affected by the magnetic field of the write transducer. Due to the high coercivity of the recording medium at room temperature, the magnetic field will have little or no effect on regions outside of the hotspot, but will change magnetic orientation within the hotspot, which is heated above the Curie temperature of the medium. It has been found that this may result in inter-bit boundaries being rounded, which can result in difficulties reading back the data at some linear data densities. As will be discussed in detail below, a HAMR device may include adaptations in both read and write systems to deal with rounded inter-bit boundaries.

Figure 1:
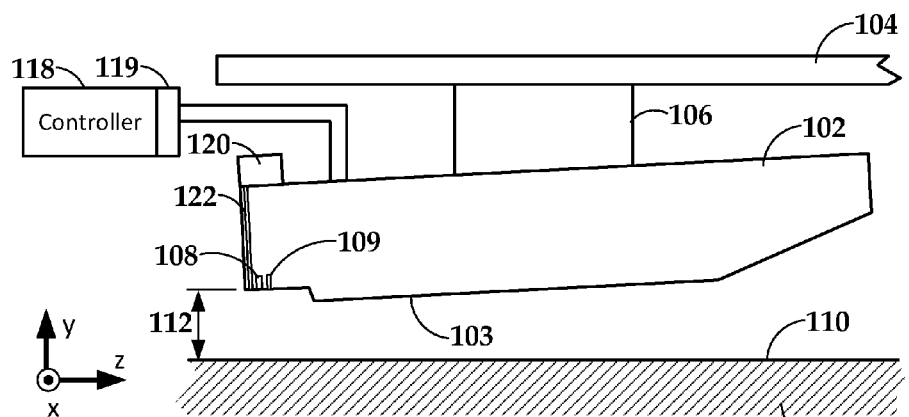
FIG. 1 is a block diagram of a hard drive slider and media arrangement according to an example embodiment.

In reference now to FIG. 1, a block diagram shows a side view of a HAMR read/write head 102 according to an example embodiment. The read/write head 102 may be used in a magnetic data storage device, e.g., hard drive. The read/write head 102 may also be referred to herein as a slider, read head, recording head, etc. The read/write head 102 is coupled to an arm 104 by way of a suspension 106 that allows some relative motion between the read/write head 102 and arm 104. The read/write head 102 includes read/write transducers 108, 109 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 119 is coupled to the read/write head 102 via interface circuitry 119. The interface circuitry 119 may include preamplifiers, filters, digital-to-analog converters (DACs), analog-to-digital converters (ADCs), buffers, etc. The controller processes signals sent to and received from the read and write transducers 108, 109. The controller 118 may also control other aspects of the head's operation, such as dynamic head-media spacing via internal heaters (not shown), and activating laser 120.

The illustrated read/write head 102 is configured as a HAMR recording head, which includes additional components that generate heat near the write transducer 108. These components include the laser 120 (or other energy source) and waveguide 122. The waveguide 122 delivers light from the laser 120 to components near the read/write transducers 108. These components are shown in greater detail in FIG. 2.

Figure 2:
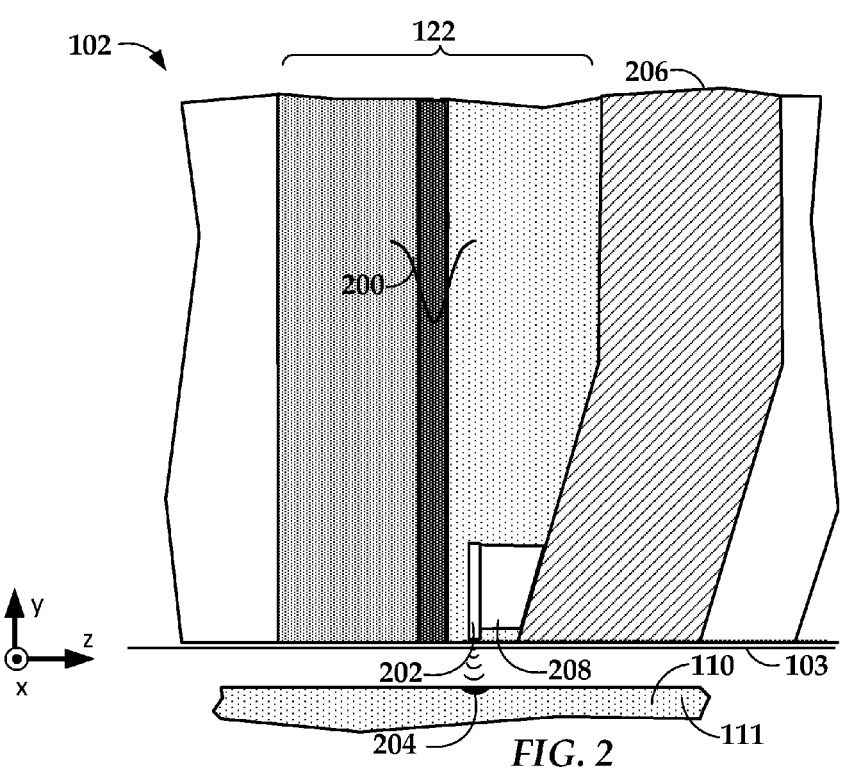
FIG. 2 is a cross-sectional view of a read/write head according to an example embodiment.

In FIG. 2, a block diagram illustrates a cross-sectional view of the HAMR read/write head 102 according to an example embodiment. The waveguide 122 receives electromagnetic energy 200 from the energy source, and couples the energy 200 to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

Figure 3:
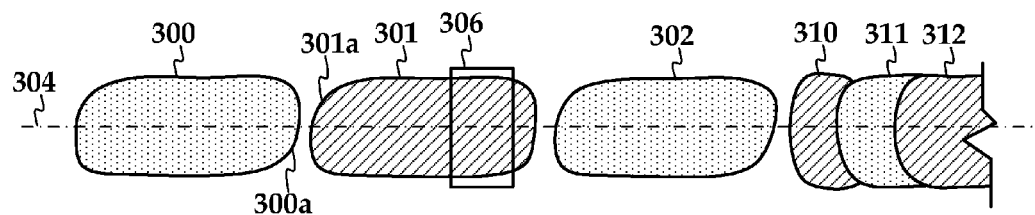
FIGS. 3-6 are block diagrams showing bit patterns on a recording medium and readers used therewith according to example embodiments.

In FIG. 3, a block diagram illustrates an example bit pattern formed by a HAMR writer according to example embodiments. Individual bits 300-303 are written on a track, as indicated by track centerline 304. The different shading indicates different orientation of magnetic flux, so in this example the bits 300-303 would be alternating between one and zero. While not shown, multiple bit regions (e.g., regions of successive ones or zeros) may be respectively longer than the indicated single bit regions 300-303. As seen in this illustration, flux boundaries between the bits 300-303 have curved edges, e.g., edges 300a, 301a.

At the illustrated linear density of bits 300-302 (which may be expressed as bits-per inch or BPI), the rounding of the inter-bit edges, e.g., edges 300a, 301a, may not pose significant challenges during read-back, because the length of the bits in the downtrack direction is significantly larger than the amount of curvature When the read transducer 306 is positioned over the bits 300-302, the bits are sufficiently large that the decoder can account for variability in transitions caused by the rounding. As linear density is increased, the effects of curvature of inter-bit boundaries can become more significant. This is shown by bits 310-312, which are written at a higher BPI than bits 300-302. For bits 310-312 the variability in edge detection due to rounding is larger compared to the downtrack bit length, which can increase error rates during read-back. Another example of this is shown in the diagram of FIG. 4.

Figure 4:
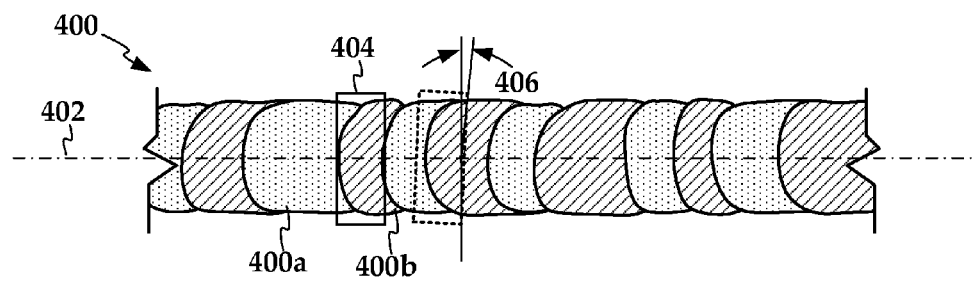

In FIG. 4, a series of bits 400 are arranged over a track centerline 402. In this example, longer regions, e.g., region 400a, represent multiple bits of the same value, while shorter regions, e.g., region 400b, represent a single bit. A read transducer 404 is shown positioned over the single bit region 400b. Due to the curvature of the inter-bit boundaries, a portion of the read head 404 (e.g., upper and lower left corners in this view) are over an adjacent region 400a having opposite magnetic orientation. This may lead to variations or errors in detecting the inter-bit transitions, which may ultimately lead to errors reading the recorded data due to the small downtrack length of an individual bit.

In embodiments described herein, a read head and/or servo system may include features to compensate for curved bit edges that may result from HAMR recording (and may be applicable to similar effects in other types of recording). As seen in FIG. 4, the read transducer 404 is shown at zero skew relative to the track, and current systems may designed to operate with zero skew as a target (e.g., nominal zero skew, or average zero skew over all track radii), although the reader may be skewed at some positions of the disk. Because the arm that positions the read/write head rotates, there will be increasingly larger skew angles as the arm is moved to inner and outer tracks. However, this skew affects both the read transducer and the write transducer by a similar amount as they are both integrated into the same read/write head.

To compensate for inter-bit curvature, the read transducer can be at a deliberate skew angle (e.g., skew angle 406) that is different from a skew angle of the write transducer, such that the orientation compensates for parts of the curvature. An example of this is shown in the block diagram of FIG. 5. A series of individual bits 500 are shown simplified as circular shapes. The bits 500 are recorded using a write transducer (e.g., write pole) at zero nominal skew, e.g., normal to a centerline of the track. A full-track-width read transducer 502 and partial-track-width transducer 504 are shown skewed and offset in a cross-track direction relative to a track centerline 506. For comparison, similar sized full- and partial width transducers 508, 510 are shown at zero skew and centered over the centerline 506. Generally, the skewed and offset transducers 502, 504 overlap less of the adjacent bits than the un-skewed transducers 508, 510. Compared to transducers 508, 510, the skewing and offsetting can allow the transducers 502, 504 to be better aligned with boundaries of the individual bits 500, and may also allow the transducers 502, 504 to cover more area of individual bits. The amount of benefit may depend on the amount of curvature and skew, although generally the smaller transducers 504, 510 may have less adjacent bit interference.

Figure 7:
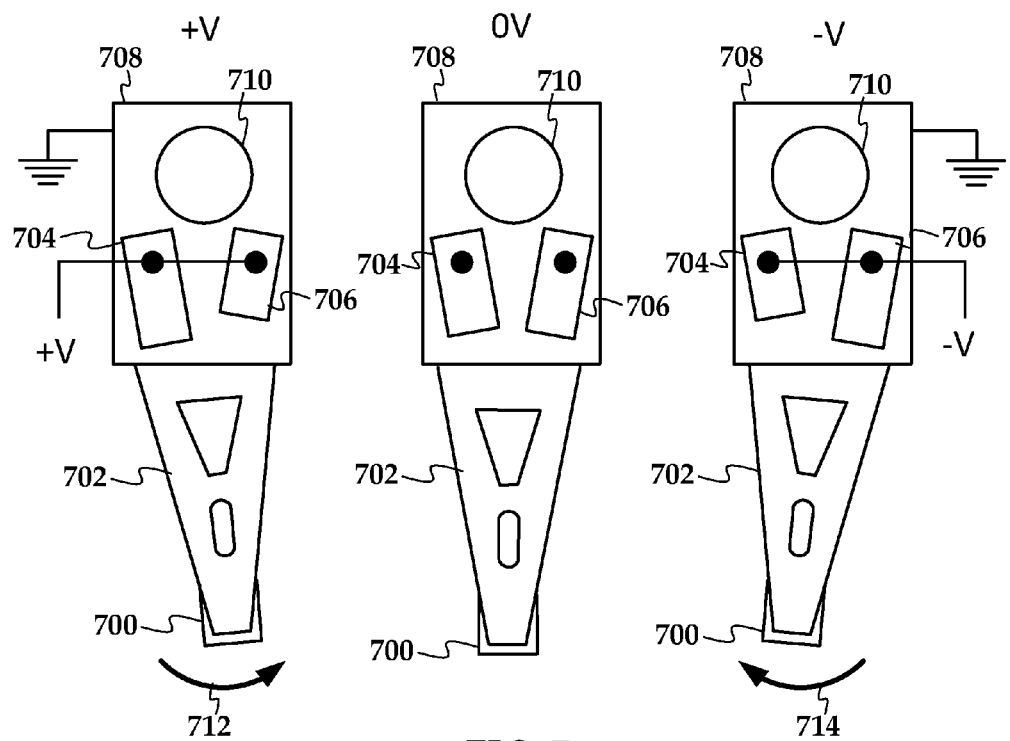
FIG. 7-9 are block diagrams showing microactuators being used to select different read and write skew values according to example embodiments.
Figure 8:
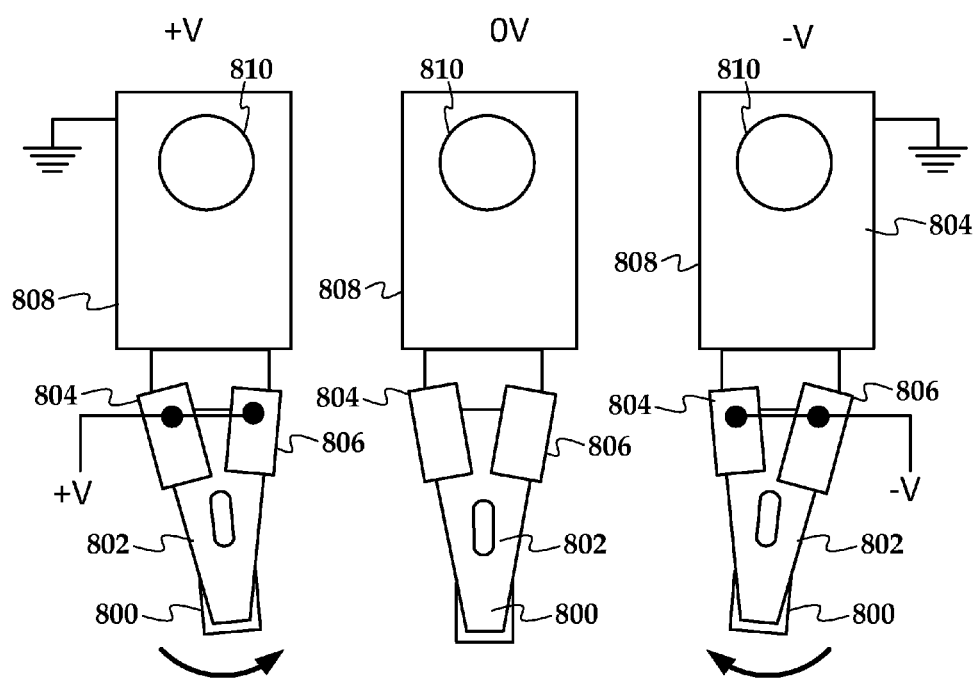
Figure 9:
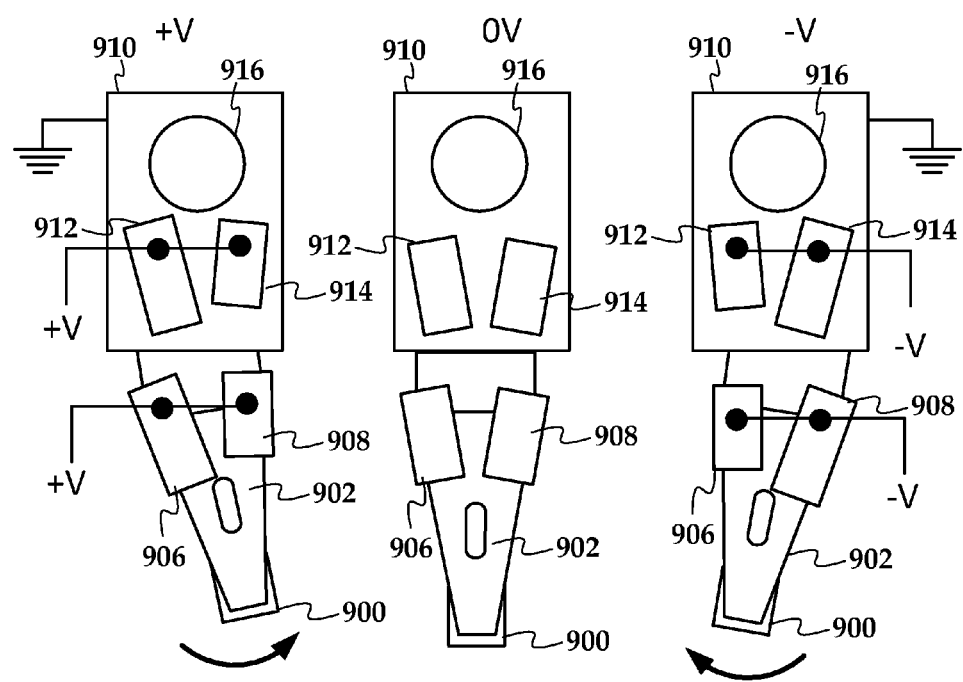
Figure 10:
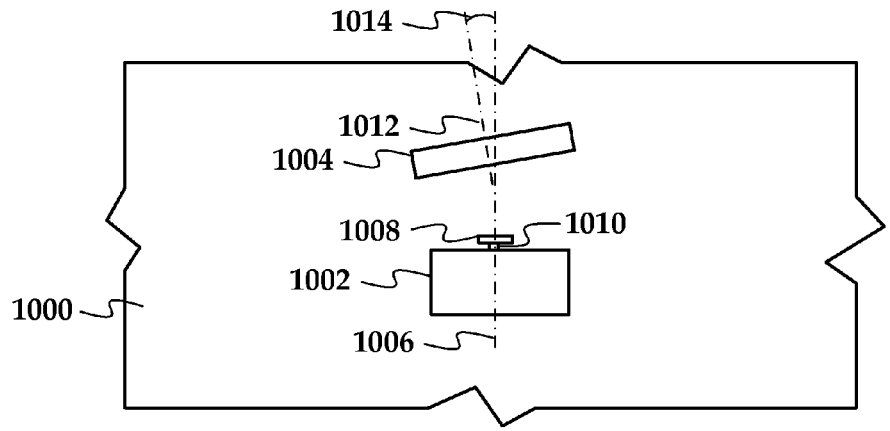
FIG. 10 is a block diagram showing a skewed reader according to an example embodiment.

This skewing of the read transducer relative to the writer can be achieved by the fabrication process, e.g., depositing the read transducer stack at an angle to the substrate on which the write transducer is formed, or vice versa. This is shown in FIG. 10 and described in greater detail below. In the alternate, the readers and writers can be aligned/parallel with each other, and an actuating mechanism may be used to change the skew during reading and writing operation. This is shown in FIGS. 7-9 and discussed in greater detail below. Another way to reduce the effect of curvature is to erase the areas of most curvature and concentrate on reading areas that can be more easily read. An example of the latter technique shown in FIG. 6. It will be understood that any of these techniques (e.g., passively-induced skew, actively-induced skew, partial track erasure) can be combined.

Figure 5:
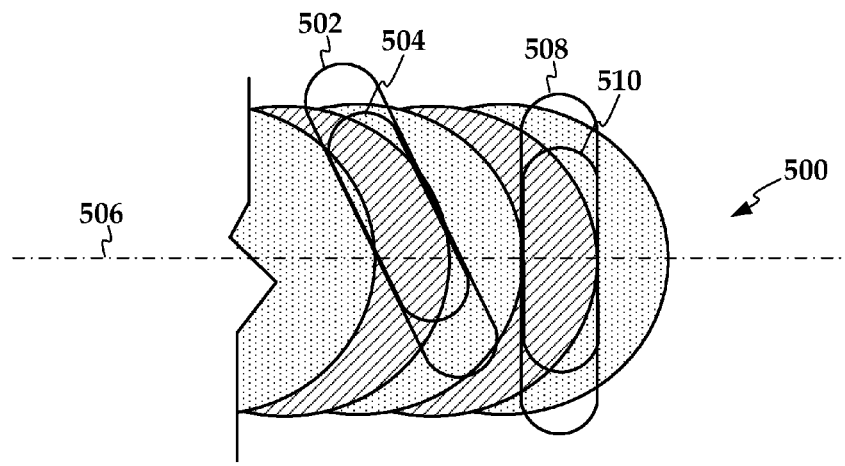
Figure 6:
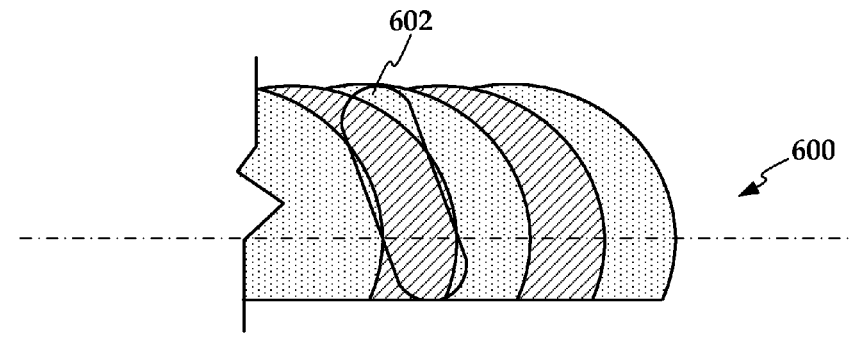

In FIG. 6, a series of bits 600 are recorded using a write transducer (e.g., write pole) at zero skew, similar to what is shown in FIG. 5. In this example a bottom part of the bits are either erased or overwritten by an adjacent track. This may occur using a technique known as shingled recording, where a track is partially overlaid on a previously written adjacent track. As indicated by reader 602, the read transducer may be smaller than the cross-track footprint of the writer, e.g., as shown by the full-sized bits 500 in FIG. 5.

As previously noted, the skew between the read and write transducers may be built into a read/write head (e.g., passive) or be selectably applied (e.g., active). In FIG. 7, a block diagram shows how microactuators may be used to actively select different read and write skew values according to an example embodiment. A read/write head 700 is mounted to an end of a distal arm portion 702, e.g., via a gimbal. Microactuators 704, 706 (e.g., piezo actuators) couple the arm portion 702 to a second (e.g., base) arm portion 708. The second arm portion 708 is rotated around pivot 710 at an opposite end by a voice coil motor (not shown) or similar actuator.

The microactuators 704, 706 are arranged to rotate the second arm portion 702 either counterclockwise (as indicated by arrow 712) or clockwise (as indicated by arrow 714) depending on the polarity of drive signal, shown here as +V and −V. Generally, the microactuators are arranged with opposite polarity so that one of the microactuators 704, 706 extends when the other retracts, and vice versa. The neutral position is in the middle, where no voltage is applied to the microactuators 704, 706. Intermediate rotations can be achieved by varying a magnitude of the positive or negative voltage applied to the microactuators 704, 706.

As should be apparent from the drawing, rotation of the second arm portion 702 via the microactuators 704, 706 can affect skew of the read/write head 700 relative to a track. As such, the microactuators 704, 706 may be configured to displace around a non-zero skew angle (e.g., rotations indicated by arrows 712, 714) when servo tracking during writing, and displacing around zero skew angle when reading. This may involve selecting microactuators 704, 706 with sufficient stroke to operate from a non-zero skew neutral point while still being able to provide the desired cross-track displacement during writing. For example, if the desired skew angle is A1 and the maximum displacement for servo tracking during both reading and writing involves a stroke angle of ±A2, then the microactuators 704, 706 may be configured to have maximum stroke of at least ±(A1+A2).

In FIG. 8, a block diagram shows how microactuators may be used to select different read and write skew values according to another example embodiment. A read/write head 800 is mounted to an end of an arm portion 802, e.g., via a gimbal. Microactuators 804, 806 couple the arm portion 802 to a second arm portion 808. The second arm portion 808 is rotated around pivot 810 at an opposite end by a voice coil motor (not shown) or similar actuator. In contrast to the arrangement shown in FIG. 7, the microactuators are closer to the read/write head 800. Otherwise, the operation is similar, rotating the second arm portion depending on the polarity of drive signal, +V and −V. Generally, this arrangement will provide more rotation of the read/write head 800 for a given cross-track displacement compared to the arrangement of FIG. 7, because the radius of rotation in the arrangement of FIG. 8 is smaller.

In FIG. 9, a block diagram illustrates microactuators used to select different read and write skew values according to another example embodiment. Generally, this arrangement includes a combination of microactuators similar to those shown in both FIGS. 7 and 8. A read/write head 900 is mounted to an end of a distal arm portion 902, e.g., via a gimbal. Microactuators 904, 906 couple the distal arm portion 902 to a second, middle arm portion 908. The middle arm portion 908 is coupled to a third, base arm portion 910 via microactuators 912, 914. The base arm portion 910 rotates around pivot 916 at an end opposite the microactuators 912, 914 by a voice coil motor (not shown) or similar actuator.

Similar to the previous embodiment, the middle and end arm portions can be selectively rotated by changing a magnitude and polarity of drive signal. In the illustration, microactuator sets 906, 908 and 912, 914 are shown driven by the same signal, e.g., either +V or −V. However, the microactuator sets 906, 908 and 912, 914 may be driven by different signals, and further may handle different aspects of servo tracking and skew. For example, microactuators 912, 914 may be used to perform fine tracking of the read/write head, e.g., in response to commands from a servo controller based on position error detection. At the same time, microactuators 904, 906 may be used to set desired skew of the read/write head 900, e.g., in response to commands from a servo controller based on current radial positioned as determined by current track or zone. Generally, while more complex than the other arrangements, this arrangement can provide nearly constant skew angles over the entire recording medium independently of servo position control, and can selectably change skew based on reading or writing.

As previously noted, a read/write head may, in the alternative or in addition, may introduce relative skew between read and write transducers via construction of the read/write head. In FIG. 10, a diagram illustrates an example of a skewed reader according to an example embodiment. The view in FIG. 10 is taken from a media-facing surface 1000 of a read/write head. A write pole 1002 is located downtrack from a read transducer 1004, the downtrack direction being indicated by write pole centerline 1006. A waveguide 1008 and NFT 1010 are shown near the write pole 1002.

As indicated by centerline 1012 of the read transducer 1004, the read transducer 1004 is formed on the read/write head at an angle 1014 to the write transducer, which includes at least the write pole 1002. The angle 1014 is equal to a difference between a respective first skew angle and second skew angle of the read transducer 1004 and write pole 1002 when positioned over a recording medium. The part of the read transducer 1004 that is oriented at the first skew angle may at least include magnetoresistive stacks. Other components, such as reader shields, may be also skewed or aligned with the write pole 1002.

While the illustrated write pole 1002 is shown so that it would be nominally normal relative to the track (e.g., normal at a radial midpoint between an innermost and outermost track) and the read transducer is not nominally normal, other arrangements may be possible. For example, the write pole 1002 may be configured to write bits at a skew angle that is nominally non-normal to the centerline of the track. The centerline 1012 of the read transducer 1004 may be nominally normal to the centerline of the track. In another arrangement, the skew angles of the write pole 1002 and the read transducer may be nominally non-normal and opposite (e.g., negative and positive angles, or vice versa) relative to the centerline of the track. For example, the read transducer 1012 may be oriented at +n degrees relative to the track centerline, and write pole 1002 may be oriented at −m degrees relative to the track centerline (or vice versa), where n>0 and m>0.

Figure 11:
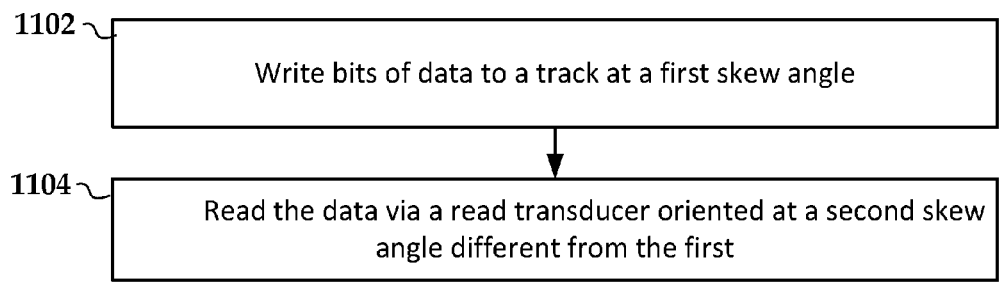
FIG. 11 is a flowchart of a method according to an example embodiment.

In reference now to FIG. 11, a flowchart illustrates a method according to an example embodiment. The method involves writing 1102 bits of data to a track of a heat-assisted magnetic recording medium via a write transducer at a first skew angle. The data is then read 1104 via a read transducer oriented at a second skew angle different from the first skew angle. The second skew angle causes the read transducer to be more closely aligned with boundaries of the bits than if it was oriented at the first skew angle. In one embodiment, the read transducer may be formed on a read/write head at an angle to the write transducer, the angle being equal to the difference between the first skew angle and the second skew angle. In another embodiment, the write and read transducers may be selectably oriented at the first and second skew angles via an actuator, e.g., a piezo microactuator.

Figure 12:
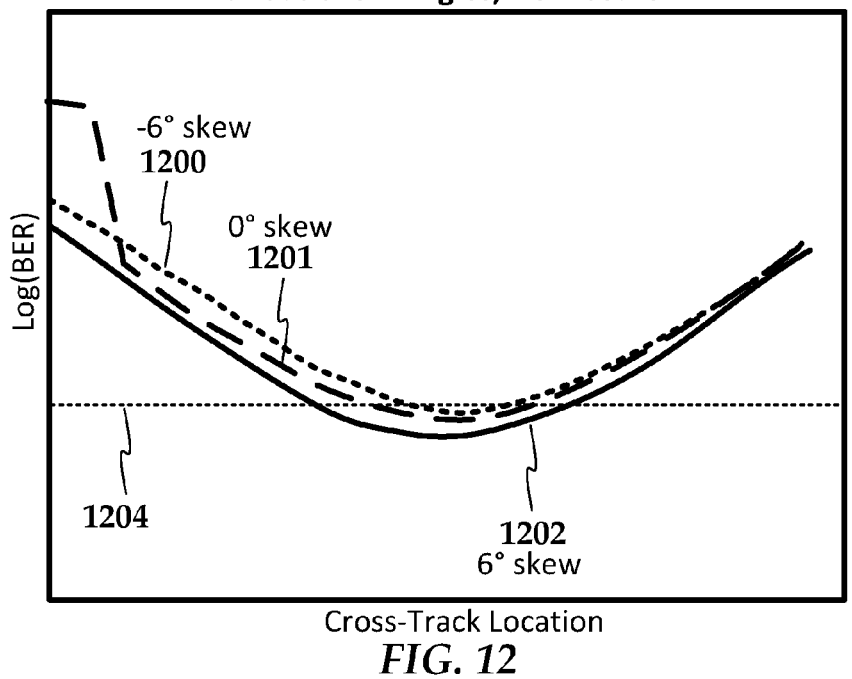
FIGS. 12 and 13 are graphs showing test results of reading a track at various skew angles according to an example embodiment.
Figure 13:
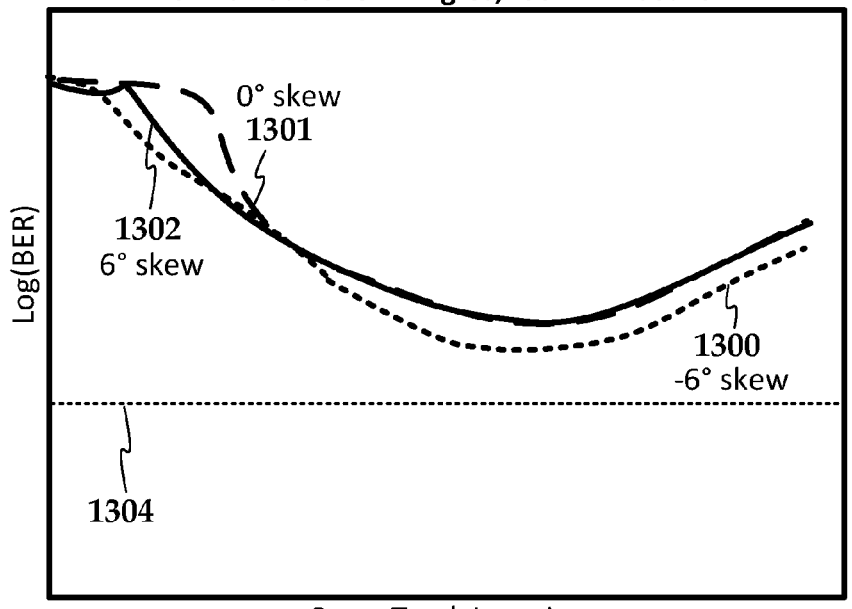

In FIGS. 12 and 13, graphs illustrate example testing results of a HAMR device according to an example embodiment. A same data track was recorded at a zero skew angle, and bit error rate (BER) was measured when reading back the track at different cross track directions using three different skew angles, −6°, 0°, and +6° as indicated respectively by curves 1200-1202 of FIG. 12. The lowest point of curve 1201 generally corresponds to the track center. In this example, the +6° read skew resulted in lowering the BER compared to the other skew values. Line 1204 is a reference BER value that facilitates comparison between FIGS. 12 and 13, e.g., the same BER level is indicated by line 1304 in FIG. 13.

For the results shown in FIG. 13, a similar test was performed but with 55 nm of erasure at one side of the track. Curves 1300-1302 represent cross-track dependent BER at respective read skew angles of −6°, 0°, and +6°. The erasure can be evidenced in FIG. 13 due to the shifting of the track center and the BER peaks at the left side of the graph where the erasure occurred. Generally, these results indicate that orienting a read transducer at a different angle than a write transducer can improve BER for HAMR data storage. In this case, the −6° read skew produced the lowest BER. While the overall BER shown in FIG. 13 is greater than that shown FIG. 12, this can be accomplished at a higher TPI due to the narrower track. As such, BPI can be increased to lower BER while still maintaining a high areal density.

Figure 14:
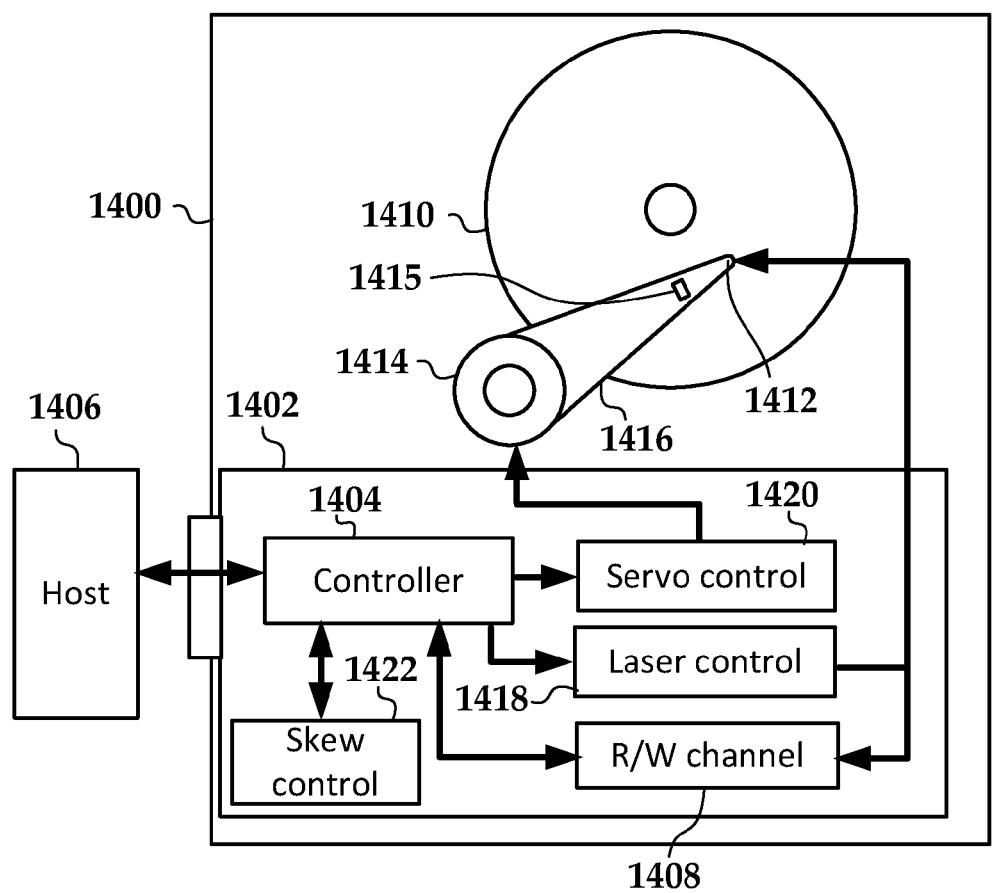
FIG. 14 is a block diagram of a system and apparatus according to an example embodiment.

In FIG. 14, a block diagram illustrates a data storage system according to an example embodiment. A data storage apparatus 1400 includes logic circuitry 1402 used to read data from and write data to one or more magnetic disks 1410. The magnetic disks 1410 are configured as a heat-assisted magnetic recording medium. The logic circuitry 1402 includes one or more controllers 1404 that perform operations associated with storing and retrieving data from the disks 1410. The operations include processing read and write commands that originate from a host device 1406. The host device 1406 may include any electronic device that can be communicatively coupled to store and retrieve data from a data storage device, e.g., a computer, peripheral bus card, factory testing apparatus, etc.

The controller 1404 is coupled to a read/write channel 1408 that processes data read from and written to the magnetic disk 1410. The read/write channel 1408 generally converts data between the digital signals processed by the controller 1404 and the analog signals conducted through one or more read/write heads 1412 (also referred to as a recording head). The read/write heads 1412 are positioned over the magnetic disk 1410 via a servo motor 1414 (e.g., voice coil motor) that moves one or more arms 1416 to which the read/write heads 1412 are mounted. One or more microactuators 1415 may also be included that move the read/write heads 1412.

During write operations, a laser control circuit 1418 sends power to one or more lasers (or similar thermal energy producing devices) of the read/write head 1418. The laser control circuit 1420 may include a DAC, preamplifier, filters, etc., that control and condition signals send to the lasers, which are used energize a near-field transducer that creates a hotspot on the disk 1410 during recording. The controller 1404 may receive feedback signals (not shown) that assist in controlling the laser, such as intensity readings from a head-mounted photodiode, etc.

A servo controller 1420 is part of a control system that positions the read/write head 1412 over the disk. 1410. The read/write head 1412 reads servo marks on the disk 1410, which are converted to servo data (e.g., track information, position error) via the read/write channel 1408. The servo controller 1420 uses the servo data to drive the servo motor 1414 and microactuators 1415 to a desired location. The servo controller 1420 may also be used to selectably induce (e.g., via microactuator 1415) first and second skew angles between respective write and read transducers of the read/write head 1412. During write operations, the servo controller 1420 can cause the microactuator 1415 to induce the first skew angle and during read operations and induce the second skew angle during read operations.

In addition or in the alternative, a skew controller 1422 may provide information, commands, signals, etc., that facilitate setting separate skew angles for read and write operations. The skew controller 142 may include a separate processor, e.g., a specialize microcontroller. In other arrangements, the skew controller 142 may be configured as a module (e.g., software, firmware) operable via the main controller 1404 and/or servo controller 1420. The skew controller 1422 may also be used to perform other operations, such as finding an optimum skew angle for a given apparatus.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    writing bits to a track of a magnetic recording medium via a write transducer at a first skew angle; and
    reading the track via a read transducer oriented at a second skew angle different from the first skew angle, the second skew angle causing the read transducer be more closely aligned with boundaries between the bits than if oriented at the first skew angle.

2. The method of claim 1, wherein the first skew angle is nominally normal relative to a centerline of the track.

3. The method of claim 1, wherein the read transducer is formed on a read/write head at an angle to the write transducer, the angle equal to the difference between the first skew angle and the second skew angle.

4. The method of claim 1, further comprising selectably orienting the write and read transducers at the first and second skew angles via a microactuator.

5. The method of claim 1, wherein reading the data further comprises offsetting a center of the read transducer in a cross-track direction relative to a centerline of the track.

6. The method of claim 1, wherein the boundaries between the bits have curved edges.

7. The method of claim 6, further comprising overwriting or erasing one edge of the track to minimize effects from the curved edges of the bit boundaries.

8. The method of claim 7, wherein the overwriting or erasing is performed via shingled writing of data to an adjacent track.

9. The method of claim 1, wherein the first skew angle and the second skew angle are nominally non-normal and opposite relative to a centerline of the track.

10. The method of claim 1, wherein the second skew angle causing the read transducer cover more area of individual bits than if oriented at the first skew angle.

11. An apparatus, comprising:
    a controller configured to position a read/write head during reading from and writing to a magnetic recording medium, the controller performing:
        setting a write transducer of the read/write head to a first skew angle while a writing bits to a track of the recording medium; and
        setting a read transducer of the read/write head to a second skew angle while a reading the track, the second skew angle causing the read transducer to be more closely aligned with boundaries between the bits than if oriented at the first skew angle.

12. The apparatus of claim 11, wherein the controller further offsets a center of the read transducer in a cross-track direction relative to a centerline of the track.

13. The apparatus of claim 11, wherein the boundaries between the bits have curved edges.

14. The apparatus of claim 13, wherein the controller further overwrites or erases one edge of the track to minimize effects from the curved edges of the bit boundaries.

15. The apparatus of claim 14, wherein the overwriting or erasing is performed via shingled writing of data to an adjacent track.

16. The apparatus of claim 11, wherein the first skew angle is nominally normal relative to a centerline of the track.

17. The apparatus of claim 11, wherein the first skew angle and the second skew angle are nominally non-normal and opposite relative to a centerline of the track.

18. An apparatus, comprising:
- a read/write head configured to read from and write to a heat-assisted magnetic recording medium, the read write head comprising performing:
  - a write transducer oriented at a first skew angle relative to a centerline of the read/write head, the write transducer configured to write bits to a track of the recording medium; and
  - a read transducer oriented at a second skew angle relative to a centerline of the read/write head, the second skew angle causing the read transducer to cover more area of the bits than if oriented at the first skew angle.

19. The apparatus of claim 18, wherein a center of the read transducer is offset in a cross-track direction relative to a centerline of the track when reading.

20. The apparatus of claim 18, wherein flux boundaries between the bits have curved edges.

* * * * *